United States Patent [19]
Antonov

[11] Patent Number: 5,885,180
[45] Date of Patent: Mar. 23, 1999

[54] TRANSMISSION DEVICE, MORE PARTICULARLY FOR A VEHICLE, AND A CONTROL METHOD RELATING THERETO

[75] Inventor: Roumen Antonov, Paris, France

[73] Assignee: Antonov Automotive Technologies B.V., Rotterdam, Netherlands

[21] Appl. No.: 793,063

[22] PCT Filed: Aug. 17, 1995

[86] PCT No.: PCT/FR95/01091

§ 371 Date: Feb. 14, 1997

§ 102(e) Date: Feb. 14, 1997

[87] PCT Pub. No.: WO96/06293

PCT Pub. Date: Feb. 29, 1996

[30] Foreign Application Priority Data

Aug. 18, 1994 [FR] France .................................. 94 10109

[51] Int. Cl.[6] ............................ F16H 63/30; F16H 61/02
[52] U.S. Cl. ......................... 475/116; 475/258; 475/267
[58] Field of Search .................................... 475/116, 127, 475/258, 262, 267, 347, 95, 96, 97, 98

[56] References Cited

U.S. PATENT DOCUMENTS

| | | | |
|---|---|---|---|
| 5,106,348 | 4/1992 | Koivunen | 475/126 |
| 5,263,906 | 11/1993 | Antonov | 475/258 X |
| 5,409,428 | 4/1995 | Antonov | 475/258 |
| 5,514,043 | 5/1996 | Antonov | 475/262 X |
| 5,514,044 | 5/1996 | Antonov | 475/262 X |
| 5,655,984 | 8/1997 | Antonov | 475/258 X |
| 5,704,459 | 1/1998 | Antonov | 475/93 X |

FOREIGN PATENT DOCUMENTS

| | | |
|---|---|---|
| WO 92/07206 | 4/1992 | WIPO . |
| WO 94/19629 | 9/1994 | WIPO . |

*Primary Examiner*—Dirk Wright
*Assistant Examiner*—Peter T. Kwon
*Attorney, Agent, or Firm*—Kenyon & Kenyon

[57] ABSTRACT

A planet gear (9) connected to the input shaft (2a) and a planet carrier (13) connected to the output shaft (18) can be coupled by a clutch (18) operated in clamping by fly weights (29) and a spring (34) to bring about direct engagement. If clamping is insufficient for torque to be transmitted, the crown wheel (8) slows down and is then immobilized by the free wheel (16). The device then acts as a reduction gear, with a piston (44) acting on the housing (2) in the direction which will release the clutch (18) and applying a brake (43) preventing the crown wheel (8) from rotating even in the direction normally permitted by the free wheel (16). Narrow bleed ducts (151, 172) of a chamber (40) associated with a piston (44) and a damping chamber (171) prevent sudden variations in the state of the clutch (18). The transmission device enables operation as a reduction gear, especially when the vehicle engine is used as a brake, and operates at low speed or at high load, while avoiding shocks produced when the piston is activated or deactivated.

34 Claims, 3 Drawing Sheets

FIG_1

FIG_2

FIG_3

FIG_4

FIG. 5

TRANSMISSION DEVICE, MORE PARTICULARLY FOR A VEHICLE, AND A CONTROL METHOD RELATING THERETO

FIELD OF THE INVENTION

The present invention relates to an automatic transmission device having at least two ratios, in particular for a vehicle.

The present invention also relates to a method of controlling such a transmission device.

RELATED TECHNOLOGY

WO-A-9207206 discloses an automatic transmission in which a clutch selectively connects two rotary members of a differential gearing, such as an epicyclic train, according to whether one or other of two antagonistic forces is stronger. Such forces are for example an axial thrust produced by an axially movable helical gear, tending to release the clutch against the action of springs and/or a force produced by a centrifugal tachometric means, tending to engage the clutch. When the clutch is released, it is necessary to prevent rotation of a third rotary member of the differential gearing, and this can be ensured by a free wheel preventing this third member from rotating in the reverse direction.

This type of transmission is very advantageous as its basic functioning requires neither an external power source, nor sensors, nor a control circuit. It is the transmission device itself which produces the forces which will control it and these forces are at the same time measurement of the parameters necessary for the control.

However, such a transmission device is not directly capable of optimising the hold-back operation, that is to say when the accelerator pedal is released so that the engine provides a certain braking of the vehicle. In this case, the resistant torque of the engine no longer depends on anything else than its rotating speed and is not therefore indicative of the deceleration desired by the driver. Furthermore, in the case in which the torque is detected by a reaction of helical teeth, this reaction changes direction during hold-back operation and therefore it no longer tends to release the clutch. Furthermore, in the case of the structure using a free wheel, even if the reaction of the teeth was capable of releasing the clutch in order thus to create one of the conditions for speed-reducing operation, another condition would remain unsatisfied: during the hold-back operation, the third rotary member of the differential gearing tends to rotate not in the reverse direction, but at high speed in the normal direction, which the free wheel cannot prevent.

WO94/19629, published after priority date enjoyed by this invention, describes how it is possible to selectely add an additional force in order to allow the hold-back operation and also to cause the transmission device to operate, in certain other cases, with another transmission ratio than that which would result from the comparison between the two basic antagonistic forces. It is thus possible to cause the transmission device to operate with a lower ratio when the driver of the vehicle presses the accelerator pedal fully down, even at speeds at which, for example, the centrifugal force, which is proportional to the square of the speed, would normally impose operation at the highest ratio.

Problems of shocks have occurred during changes of ratio. For example, such a shock occurs if the driver happens to release the accelerator pedal when the centrifugal force is in the process of making the transmission device change from the lower ratio to the higher ratio. In this case, the nascent supremacy of the centrifugal force is suddenly increased, and the changing of the coupling device to the coupled state can be sudden. The same thing can occur when the control process causes the additional force to vary, for example causes it to disappear.

U.S. Pat. No. 4,713,984 discloses a transmission device in which the clutches are not controlled by forces among which one of them would be the measurement of an operating parameter, but by mere hydraulic actuators controlled by decision means of the transmission. Means are provided to prevent shocks by restricting the oil flow rates during pressurization and during draining of the hydraulic chambers.

According to EP-A-0 149 012, in a similar configuration, the cross-section through which the oil passes varies as a function of the speed of the vehicle.

SUMMARY OF THE INVENTION

The object of the present invention is to propose a transmission device of the type in which a selective coupling means is controlled by variable antagonistic forces, and in which shocks during changes of transmission ratio are avoided.

According to the invention, the transmission device comprising a combination of intermeshed sets of teeth and a friction coupling means in which a movable engaging member is acted upon by antagonistic force application means, at least one of the antagonistic force application means applying onto the movable engaging member a force which is a measurement of an operating parameter which is relevant for automatic selection of the transmission ratio, the combination of teeth producing two different transmission ratios according to whether the friction coupling means is in a coupled state or in an uncoupled state, is characterized by shock-absorbing means mounted for braking at least some of the movements of the movable engaging member between the coupled and uncoupled states of the friction coupling means.

The shock-absorbing means, by braking the movable engaging member, prevent shocks from occurring, particularly in the cases mentioned above.

Preferably, the antagonistic force application means comprise controllable force application means which introduce into the transmission device a force which simulates an increase or a reappearance of one of the antagonistic forces normally controlling the device, thereby to more promote operation of the device in one of the transmission ratios, in comparison with the case of automatic control by the basic antagonistic force application means alone.

If the controllable force application means comprises a hydraulic actuator, the shock-absorbing means can comprise a pressure drop in a drain passage of a pressure chamber of the actuator, such that when the pressure is eliminated or reduced in the actuator in order to bring the controllable force to a zero or low value, the movable engaging member can move only at low speed in the direction causing the draining of the actuator's pressure chamber.

According to another object of the invention, the method of controlling a transmission device comprising a combination of intermeshed sets of teeth and a friction coupling means which causes the combination of teeth to operate according to one or the other of two transmission ratios, depending on whether the friction coupling means is in the coupled state or in the uncoupled state, a method in which a movable engaging member of the friction coupling device is subjected to two basic antagonistic forces, one of which, at each change of state of the friction coupling device, varies in the sense of stabilising the new state, at least one of the antagonistic force application means applying onto the movable engaging member a force which is a measurement of an operating parameter which is relevant for automatic selection of the transmission ratio, is characterized by:

furthermore subjecting the movable engaging member to a controllable force, thereby to selectively promote the appearance of one of the two states;

braking at least one direction of movement of the engaging member.

The controllable force can have a relatively low value, as it is only a kind of additional force, and it is therefore possible to produce it with a relatively low energy consumption. Shocks and jolts are avoided by braking at least one direction of movement of the engaging member, for example the direction corresponding to the disappearance of the controllable force.

According to an advantageous feature of the invention, when the basic antagonistic force or forces which the controllable force must overcome in order to change the coupling state of the friction coupling means vary as a function of a predetermined operating parameter, the strength of the controllable force is varied in the same sense as a function of this operating parameter.

Thus, when the controllable force application means intervene in order to change the state of the friction coupling means, the force which they produce is only reasonably greater than the antagonistic force to be overcome. This prevents shocks during the change of ratio which will result from this action, whatever the value of the operating parameter may be.

In the rest of the description, a transmission ratio will be referred to as "low" when it corresponds to a low speed at the output with respect to the input speed. In the opposite case, the ratio is referred to as "high".

BRIEF DESCRIPTION OF THE DRAWINGS

Other features and advantages of the invention will emerge from the following description, given with reference to non-limitative examples.

In the accompanying drawings.

DETAILED DESCRIPTION

Figures 1, 2:
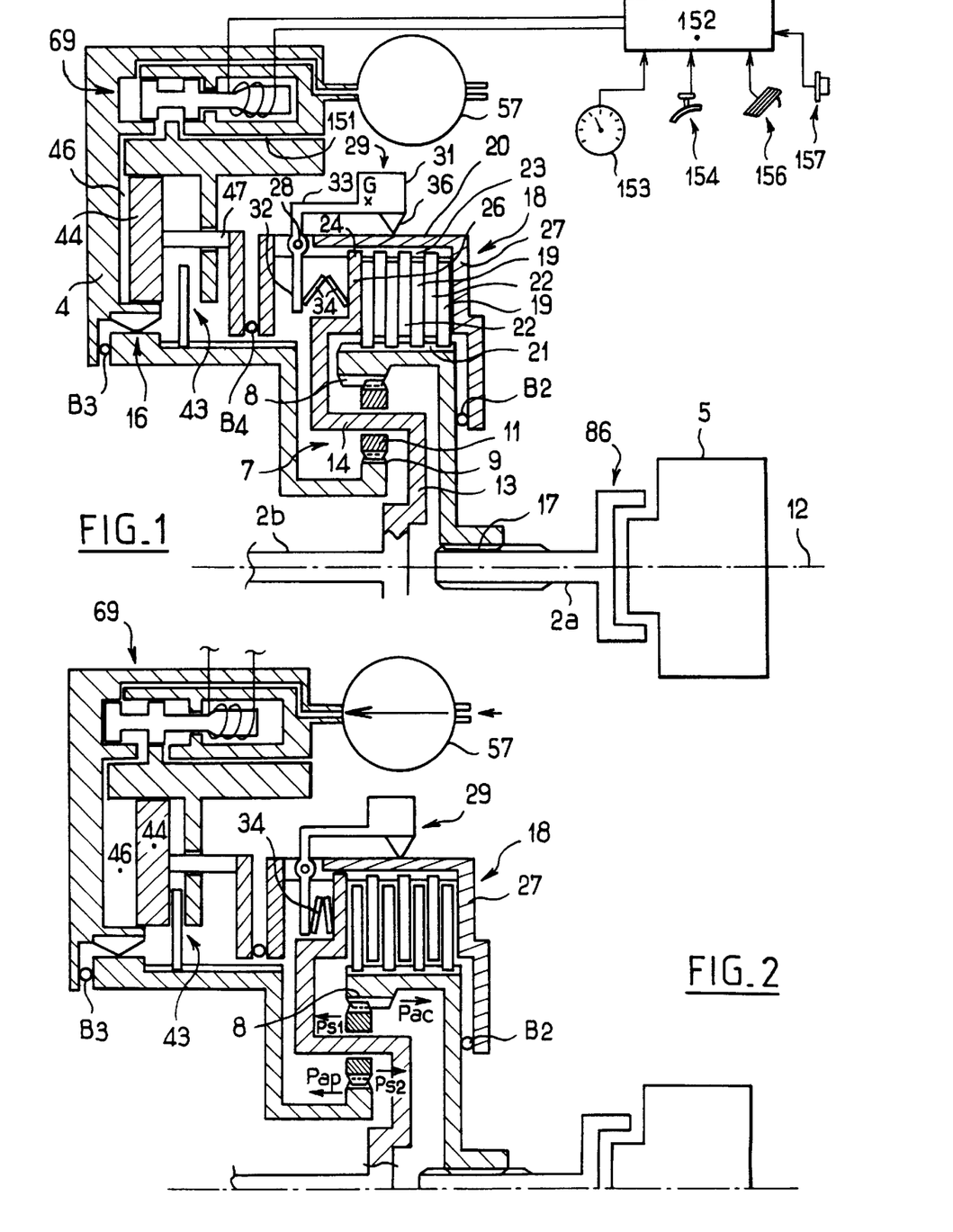
FIG. 1 is a diagrammatic, longitudinal cross-sectional half-view of a transmission device having two ratios according to the invention and in the rest state.
FIGS. 2 and 3 are views similar to that of FIG. 1 but relating to speed-reducing operation and direct drive operation respectively.

The transmission device having two ratios shown in FIG. 1, intended in particular for a motor car, comprises an input shaft 2a and an output shaft 2b in alignment with the axis 12 of the device. The input shaft 2a is connected to the output shaft of an engine 5 of a motor vehicle with the interposition of a clutch 86. The output shaft 2b is intended to drive, directly or indirectly, the input of a differential in order to drive the driving wheels of a vehicle. Between the output shaft 2b and the input of the differential there can, for example, be interposed another transmission device having two or more ratios and/or a manually controlled forward/reverse changing mechanism.

The input 2a and output 2b shafts are immobilized axially with respect to a casing 4 of the transmission device.

The transmission device comprises a differential gearing formed by an epicyclic train 7. The train 7 comprises a crown wheel 8 with internal teeth and a sun wheel 9 with external teeth, both of them meshing with planet wheels 11 supported, at equal angular intervals around the axis 12 of the transmission device, by a planet carrier 13 which is rigidly connected to the output shaft 2b. The planet wheels 11 can rotate freely about eccentric spindles 14 of the planet carrier 13. The sun wheel 9 can rotate freely about the axis 12 of the transmission device with respect to output shaft 2b which it surrounds. However, a free wheel device 16 prevents the sun wheel 9 from rotating in the reverse direction, that is to say in the direction opposite to the normal direction of rotation of the input shaft 2a, with respect to the casing 4 of the transmission.

The crown 8 is rotationally locked but is free to slide axially with respect to the input shaft 2a by the intermediary of splines 17.

A clutch 18 is disposed around the crown 8. It comprises a stack of annular disks 19 alternating with annular disks 22. The disks 19 are rotationally locked to the crown 8 with the possibility of axial sliding. For this purpose, the disks 19 have internal teeth engaged in splines 21 which are integral with the crown 8. The disks 22 are rotationally locked, with the possibility of axial sliding, to the planet carrier 13. For this purpose, a cage 20 comprises, on its radially internal face, splines 23 which are slidably engaged on the one hand by external teeth of the disks 22 and on the other hand by external teeth 24 of the planet carrier 13.

The stack of disks 19 and 22 can be axially clamped between a retaining plate 26 which is integral with the planet carrier 13 and a movable plate 27 which is part of the cage 20.

The cage 20 supports centrifugal fly-weights 29 disposed in a ring around the clutch 18.

The fly-weights are therefore rotationally locked to the output shaft 2b of the transmission device.

Each fly-weight has a solid body 31 located radially outside the disks 19 and 22 and an actuating arm 32 pressed against an external face of the retaining plate 26 via a Belleville disk spring 34. The arm 32 is connected to the solid body 31 by an elbow-bend arm 33 articulated to the cage 20 about an axis 28 oriented tangentially with respect to the axis 12 of the device. W0-A-91/13275 describes advantageous arrangements for the articulated mounting of such fly-weights. The centre of gravity G of the fly-weights is located inside or in the vicinity of the solid body 31, at a position which is at a certain distance from the axis 28, measured parallel with the axis 12 of the device.

Figure 3:
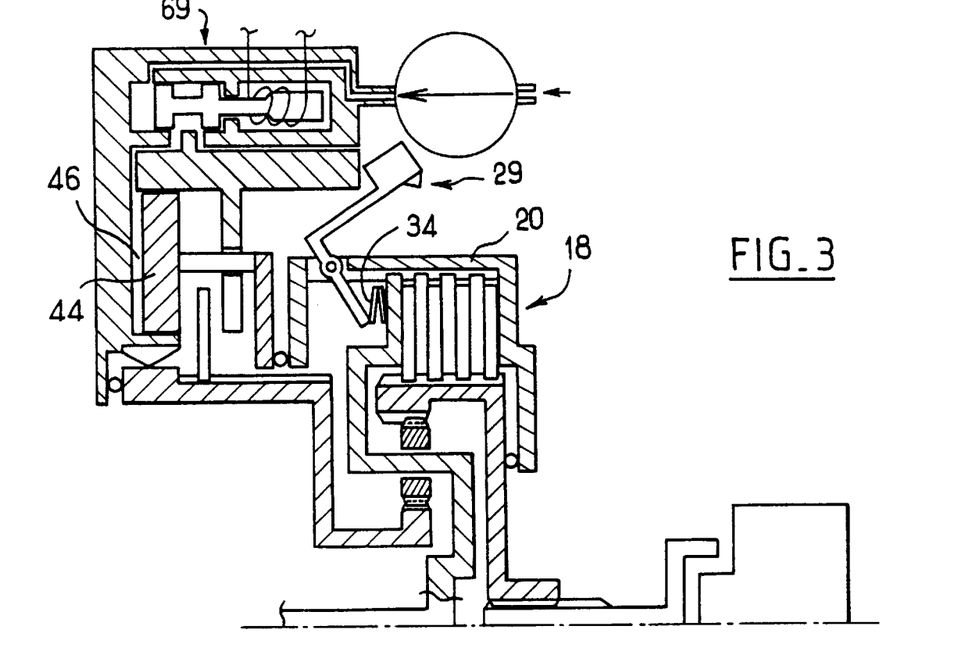

The rotation of the planet carrier 13 therefore tends to cause the bodies 31 of the fly-weights 29 to pivot radially outwards about their tangential axes 28 under the effect of their centrifugal force Fa in order to make them move from a position of rest, defined by a stop piece 36 against the cage 20, to a spread out position which can be seen in FIG. 3.

This results in a relative axial displacement between the arm 32 and the axis of articulation 28 of the fly-weight and therefore between the arm 32 and the cage 20. In relation to the direction of displacement corresponding to the centrifugal spreading out of the fly-weights 29, the cage 20 is pressed axially against the crown 8, with freedom of relative rotation, through an axial thrust bearing B2.

Therefore, the displacement of the cage 20 with respect to the arm 32 causes a relative movement towards one another of the arm 32 and the movable plate 27 of the clutch 18b. This relative displacement can correspond to a compression of the Belleville disk spring 34 and/or to a displacement of the movable plate 27 towards the retaining plate 26 in the direction of engaging the clutch 18.

When the transmission device is in the rest state as shown in FIG. 1, the Belleville disk spring 34 transmits to the cage 20, by the intermediary of the fly-weights 29 which are abutted in the rest state, a force which engages the clutch 18 such that the input 2a of the transmission device is rotationally coupled with the output 2b and the transmission device constitutes a direct drive capable of transmitting torque up to a certain maximum defined by the engaging force of the Belleville disk spring.

Furthermore, the teeth of the crown 8, of the planet wheels 11 and of the sun wheel 9 are of the helical type. Therefore, in each pair of teeth meshed under load, opposing axial thrusts appear which are proportional to the circumferential transmitted force and therefore to the torque on the input shaft 2a and to the torque on the output shaft 2b. The direction of helical inclination of the teeth is chosen such that the axial thrust Pac (FIG. 2) arising in the crown 8 when it transmits a driving torque is applied in the direction such that the crown 8 pushes the movable plate 27, by means of the thrust bearing B2. Thus, when the axial thrust Pac exists, the crown 8 pushes the plate 27 in the direction separating it from the retaining plate 26 of the clutch 18. The planet wheels 11, which mesh not only with the crown 8 but also with the sun wheel 9, are subjected to two opposing axial reactions PS1 and PS2 which balance out, and the sun wheel 9 is subjected to, because of its meshing with the planet wheels 11, an axial thrust Pap which is equal in value and opposite to the axial thrust Pac of the crown 8. The thrust Pap of the sun wheel 9 is transmitted to the casing 4 by means of a thrust bearing B3. The axial thrust Pac is thus applied against the movable plate 27 of the clutch and with respect to the casing 4 and therefore with respect to the retaining plate 26 of the clutch and in the direction tending to release the clutch 18b. This force, transmitted by the thrust bearing B2 to the cage 20, also tends to bring the arms 32 of the fly-weights 29 and the retaining plate 26 towards one another and therefore to maintain the fly-weights 29 in their position of rest and to compress the Belleville disk spring 34.

This is the situation shown in FIG. 2. Assuming that this situation is produced, the basic functioning of the transmission device will now be described. As long as the torque transmitted to unit by the input shaft 2a is such that the axial thrust Pac in the crown 8 suffices to compress the Belleville disk spring 34 and maintain the fly-weights 29 in the position of rest shown in FIG. 2, the separation between the retaining plate 26 and the movable plate 27 of the clutch is such that the disks 19 and 22 slide against each other without transmitting torque from one to the other. In this case, the planet carrier 13 can rotate at a speed different to that of the input shaft 2a, and it tends to be immobilized by the load which the output shaft 2b has to drive. The result of this is that the planet wheels 11 tend to behave as motion reversers, that is to say to rotate the sun wheel 9 in the direction opposite to the direction of rotation of the crown 8. But this is prevented by the free wheel 16. The sun wheel 9 is therefore immobilized by the free wheel 16 and the planet carrier 13 rotates at a speed which is intermediate between the zero speed of the sun wheel 9 and the speed of the crown 9 and of the input shaft 2a. The unit therefore operates as a reduction unit. If the speed of rotation increases and the torque remains unchanged, a time arrives when the centrifugal force of the fly-weights 29 produces, between the retaining plate 26 and the movable plate 27, an axial engaging force greater than the axial force Pac, and the movable plate 27 is pushed towards the retaining plate 26 in order to achieve direct drive.

When the clutch 18 is engaged, all of the power is transmitted directly from the crown 8, which is locked to the input shaft 2a, to the planet carrier 13, which is locked to the output shaft 2b. Consequently, the teeth of the epicyclic train 7 no longer work, that is to say they no longer transmit any force and they therefore do not give rise to any axial thrust. Therefore, the axial thrust due to the centrifugal force can be fully applied to engage the plates 26 and 27 against one another. The process of changing to direct drive is therefore better understood: as soon as the disks 19 and 22 begin to rub against one another and to transmit a portion of the power, the load is proportionally removed from the teeth, the axial thrust Pac reduces proportionally, and the supremacy of the centrifugal force increases until the clutch 18 is totally providing direct drive.

It can then occur that the speed of rotation of the output shaft 2b reduces and/or that the torque to be transmitted increases to the point at which the fly-weights 29 no longer provide, in the clutch 18, an engaging force sufficient to transmit the torque. In this case the clutch 18 begins to slip. The speed of the sun wheel 9 reduces until it disappears. The free wheel 16 immobilizes the sun wheel and the teeth force Pac reappears in order to disengage the clutch, such that the transmission device then operates as a reduction unit. Thus, each time a change from speed-reducing operation to direct drive operation occurs, the axial force Pac varies in the sense of stabilising the newly prevailing transmission ratio. This is very advantageous, on the one hand, in order to avoid too frequent changes of ratio around certain critical operating points and, on the other hand, in order that situations in which the clutch 18 is slipping are only transient.

By engaging the clutch when the transmission is in the state of rest, the Belleville disk spring 34 forms a mechanical coupling between the input and the output of the transmission device. Thus, the vehicle, when stationary, is held back by the engine when the latter is itself in the stopped state. If the clutch 18 was disengaged in the state of rest, the vehicle would not be prevented from moving freely in forward drive because, in this case, the immobilization of the crown 8 by the engine 5 would cause the sun wheel 9 to rotate in the normal direction, which the free wheel 16 does not prevent.

With reference to FIG. 1 there will now be described additional means provided to cause the transmission device to selectively perform speed-reducing operation under conditions other than those determined by the axial forces of the Belleville disk spring 34, the centrifugal fly-weights 29 and the teeth of the crown 8.

For this purpose, the transmission device comprises a brake 43 which makes it possible to immobilize the sun wheel 9 with respect to the casing 4 independently from the free wheel 16. In other words, the brake 43 is mounted operatively in parallel with the free wheel 16 between the sun wheel 9 and the casing 4. A hydraulic piston 44 is mounted in an axially sliding manner in order to apply and release the brake 43 selectively. The brake 43 and the piston 44 are of annular shape and their axis is the axis 12 of the transmission device. The piston 44 is adjacent to a hydraulic chamber 46 which can be selectively supplied with pressurized oil in order to force the piston 44 in the direction of applying the brake 43.

Furthermore, the piston 44 is rigidly connected to a push rod 47 which can press against the cage 20 by means of an axial thrust bearing B₄. The assembly is such that when the pressure existing in the chamber 46 is pushing the piston 44 towards the position of applying the brake 43, the cage 20, before the brake 43 is engaged, is pushed back sufficiently for the clutch 18 to be released.

Thus, when the piston 44 is in the position of applying the brake (FIG. 2), the sun wheel 9 is immobilized even if the planet carrier 13 is tending to rotate faster than the crown 8, as occurs in the case of hold-back operation, and consequently the unit performs speed-reducing operation, as allowed by the disengagement of the clutch 18.

The assembly 43, 44 , 46, 47 which has just been described therefore constitutes a means which can be made available to the driver of the vehicle to force the unit to operate as a reduction unit when the driver wishes to increase the engine braking effect, for example when descending, or when he wishes to increase the drive torque on the output shaft 2b. When the torque is a driving torque, the brake 43, if it is engaged, applies a redundant action with that of the free wheel 16, but this is not disadvantageous.

The supplying and draining of the chamber 46 are controlled by an electro-valve 69. When it is in the rest state, the electro-valve 69 (FIGS. 1 and 3) connects the chamber 46 with a leakage path 151 which is hydraulically resistant. When the electro-valve 69 is electrically powered (FIG. 2), it isolates the chamber 46 from the leakage path 151 and connects it to the outlet of a pump 57 driven by the engine 5. Independently of the state of the electro-valve 69, the pump 57 can also be used to supply a lubrication circuit (not shown) of the transmission device.

The electro-valve 69 is controlled by a control unit 152 connected to a detector 153 detecting the speed of the vehicle (or the speed of the output shaft 2b), a detector of the position of a "manual/automatic" selector 154 made available to the driver, a detector of the position of the accelerator pedal 156 and a "normal/sport" selector 157 making it possible for the driver to choose between two different automatic behaviours of the transmission device.

It has been seen above that the Belleville disk springs 34 put the transmission device in direct drive when the vehicle is stationary. On starting, it would therefore be necessary for the appearance of the teeth force Pac to cause the transmission device to change to speed-reducing operation so that starting off can then be carried out using the lowest ratio. This can systematically create an unpleasant shock. In order to prevent this, it is arranged that the brake 43, piston 44 and push rod 47 assembly puts the transmission device into its speed-reducing state when the engine is running (pump 57 in action) but when the speed of the output shaft 2b detected by the detector 153 is lower than a certain threshold "S" which will be explained later. Thus the transmission device already performs speed-reducing operation when motion of the output shaft 2b begins, and as long as the speed of the output shaft has not exceeded the threshold "S".

The behaviour selector 157 makes it possible for the driver to modify the threshold S. If the driver chooses "normal" behaviour, the threshold "S" is low and corresponds, for example, to a speed of 2500 rpm of the engine 5 when the transmission device performs speed-reducing operation.

As soon as the threshold is exceeded, the valve 69 puts the actuator 44, 46 into the drainage position and the transmission device is allowed to change to direct drive operation if the axial force generated by the fly-weights or by the spring 34 is capable of overcoming the teeth force Pac which is directed in the opposite direction. If the driver chooses "sport" behaviour, the threshold S is high to correspond, for example, to 3500 rpm for the engine 5 when the transmission device performs speed-reducing operation.

After the threshold S has been exceeded, the hydraulic chamber 46 is not drained as long as the transmission device performs speed-reducing operation because nothing pushes back the piston 44. When the force of the fly-weights starts to overcome the force of the teeth, the fly-weights raise and move the cage 20 in the direction pushing back the piston 44 by means of the thrust bearing B4. This drains the chamber 46 through the resistant hydraulic path 151 and this results in a braking or shock-absorbing force on the piston which is transmitted to the cage 20. Consequently, the fly-weights 29 are prevented from engaging the clutch 18 suddenly.

When the detector 156 detects that the accelerator pedal is pushed fully down, the control unit 152 actuates the valve 69 so that the chamber 46 is supplied and causes speed-reducing operation.

The "manual/auto" selector 154 makes it possible for the driver to choose between automatic operation which has just been described and speed-reducing operation. In the latter case, the control unit 152 causes a permanent supply of the is chamber 46.

Figure 4:
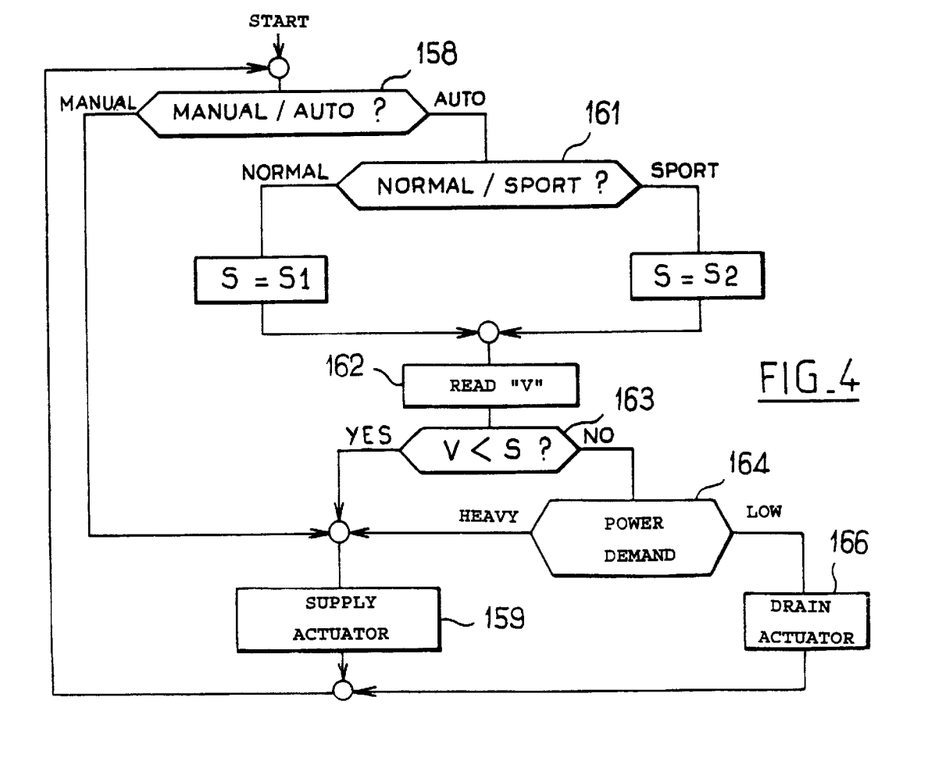
FIG. 4 is a control flowchart of the transmission device shown in FIGS. 1 to 3.

FIG. 4 shows the flowchart used by the control unit 152. A test 158 determines the state of the "manual/auto" selector 154. If the detector 154 is in the "manual" position a command 159 to supply the actuator 44, 46 is issued directly. If the selector 154 is in the "auto" position, a test 161 determines the state of the behaviour selector 157 and gives the threshold a value of S1 or S2 depending on the result of this comparison. Finally, the speed "V" of the vehicle is read (step 162) by means of the detector 153 and is then compared with the threshold S in a test 163. If the speed V is less than the threshold S, the command 159 to supply the actuator is issued. Otherwise, a test 164 commands the draining of the actuator (command 166), unless the detector of the position of the accelerator pedal 156 indicates a high power demand from the driver, in which case the command 159 to supply the actuator is issued.

Thus, in virtually all cases in which the transmission device changes from speed-reducing operation to direct drive operation, whether this is after starting off from zero speed or restarting from a low speed, or when the driver releases the accelerator pedal after having pushed it down strongly, or when he moves the selector 154 from the "manual" position to the "auto" position, or the selector 157 from the "sport" position to the "normal" position, in all of these cases the chamber 46 is loaded with hydraulic fluid and must therefore be drained, with the braking effect already described, in order that the movable plate 27 may engage the clutch 18. This is particularly advantageous in cases in which the force of the piston 44 was the determinant factor in maintaining operation as a reduction unit: in effect, in these cases the sudden disappearance of the force of the piston 44 risks creating a sudden engagement of the clutch 18. The shock absorbing due to the difficult draining of the chamber 46 prevents the clutch from being engaged suddenly in precisely all of these cases.

When the speed of the vehicle decreases, even if the driver releases the accelerator pedal, the transmission device changes to speed-reducing operation when the threshold S is passed through in the decreasing direction. The driver can also increase the engine braking effect by placing the selector 154 in the "manual" position.

In order to supply the hydraulic chamber 46 for the purpose of the functions which have just been described, it is possible to use a hydraulic pressure chosen to be sufficiently high to overcome definitely the axial force produced in the opposite direction by the fly-weights 29, whatever the speed of rotation of the flywheels around the axis 12 may be.

But for reasons of safety and energy economy, it is preferable to supply the hydraulic chamber 46 with only a pressure limited to a value such that the axial force of the piston 44 overcomes the opposing force of the fly-weights 29 only if the speed of rotation of the fly-weights is sufficiently low that the change to speed-reducing operation does not result in an excess speed of the engine 5.

In the situation shown in FIG. 1, the engine and the vehicle are stationary, the control unit 152 and the electro-valve are not supplied and therefore the electro-valve 69 is in the position for draining the chamber 46. The Belleville disk spring 34, bearing on the retaining plate 27, pushes the cage 20 into the position of engaging the clutch 18 and of draining the chamber 46. The transmission device is in direct drive and therefore allows the engine 5 to act as a parking brake.

In FIG. 2, the chamber 46 is supplied and maintains the speed-reducing operation, with the help of the teeth force Pac and against the force of the fly-weights 29 or of the spring 34 (the assembly is such that only the greater of the two forces produced by the fly-weights 29 and the spring 34 respectively acts). It is also possible that the teeth force suffices to maintain the speed-reducing operation when the chamber 46 is not supplied, but this situation is not shown. On the contrary, when the engine rotates but the clutch 86 is released, the teeth force Pac no longer exists and the piston 44 alone keeps the clutch 18 disengaged, against the action of the spring 34.

In FIG. 3, the chamber 46 is not supplied and the fly-weights 29 have pushed the cage into the position of engaging the clutch 18 and of draining the chamber 46. The Belleville disk spring 34 is compressed.

The transmission device shown in FIG. 5 will be described only where it differs with respect to that of FIGS. 1 to 3.

The use of an epicyclic train with the input on the crown and the output on the planet carrier hardly makes it possible to achieve reduction ratios greater than 1.6.

In certain cases, it is possible to require a much greater reduction, particularly when a transmission uses several two-speed devices and where certain transmission ratios are achieved by shifting one device to speed-reducing operation whilst another shifts to direct drive. It is then necessary that one of the two devices has a reduction ratio approximately equal to 3 when it performs speed-reducing operation.

In order to achieve this, it is now the sun wheel 9 which is slidingly connected to the input shaft 2a of the transmission device and which is pressed axially against the cage 20 by means of the thrust bearing B2 so that its teeth force Pap is transmitted to the cage 20 in the direction of disengaging the clutch 18.

The planet carrier 13 is still rotationally locked to the output shaft 2b, but for practical arrangement reasons, this connection is no longer direct but is made by way of the cage 20 and of axial splines 167 between the cage 20 and the output shaft 2b. The cage 20 can therefore slide freely with respect to the output shaft 2b. Means which are not shown immobilize the output shaft 2b and the planet carrier 13 axially with respect to the casing 4.

The crown 8 is connected to the casing 4 by the free wheel 16 and, selectively, by the brake 43. The free wheel 16 prevents the crown 8 from rotating in reverse. Furthermore the crown 8 transmits its axial teeth thrust Pac to the casing 4 by means of the thrust bearing B3.

The disks 19 of the clutch 18 are engaged in splines 21 which are integral with the sun wheel 9.

Furthermore, the output shaft 2b and the cage 20 each carry a flange 168, 169 which define between them an annular shock-absorbing chamber 171 connected by a hydraulically resistant path 172 to a lubrication duct 173 formed in the centre of the output shaft 2b.

In a way which is not fully shown, such a lubrication duct, supplied by the pump 59, can be provided along the whole length of the axis 12 of the transmission for lubricating the bearings, splines, thrust bearings, collars, etc. Apart from the passage 172, the chamber 171 is fluid-tight, in particular due to two seals 174 carried by the cage 20 and sliding on cylindrical bearing surfaces of the output shaft 2b during relative movements between the cage 20 and the output shaft 2b. The splines 167 are in the chamber 171. The assembly is such that the volume of the chamber 171 reduces when the cage 20 moves in the direction of disengaging the clutch 18. The disengaging of the clutch 18 therefore requires the chamber 171 to be drained through the narrow passage 172.

Figure 5:
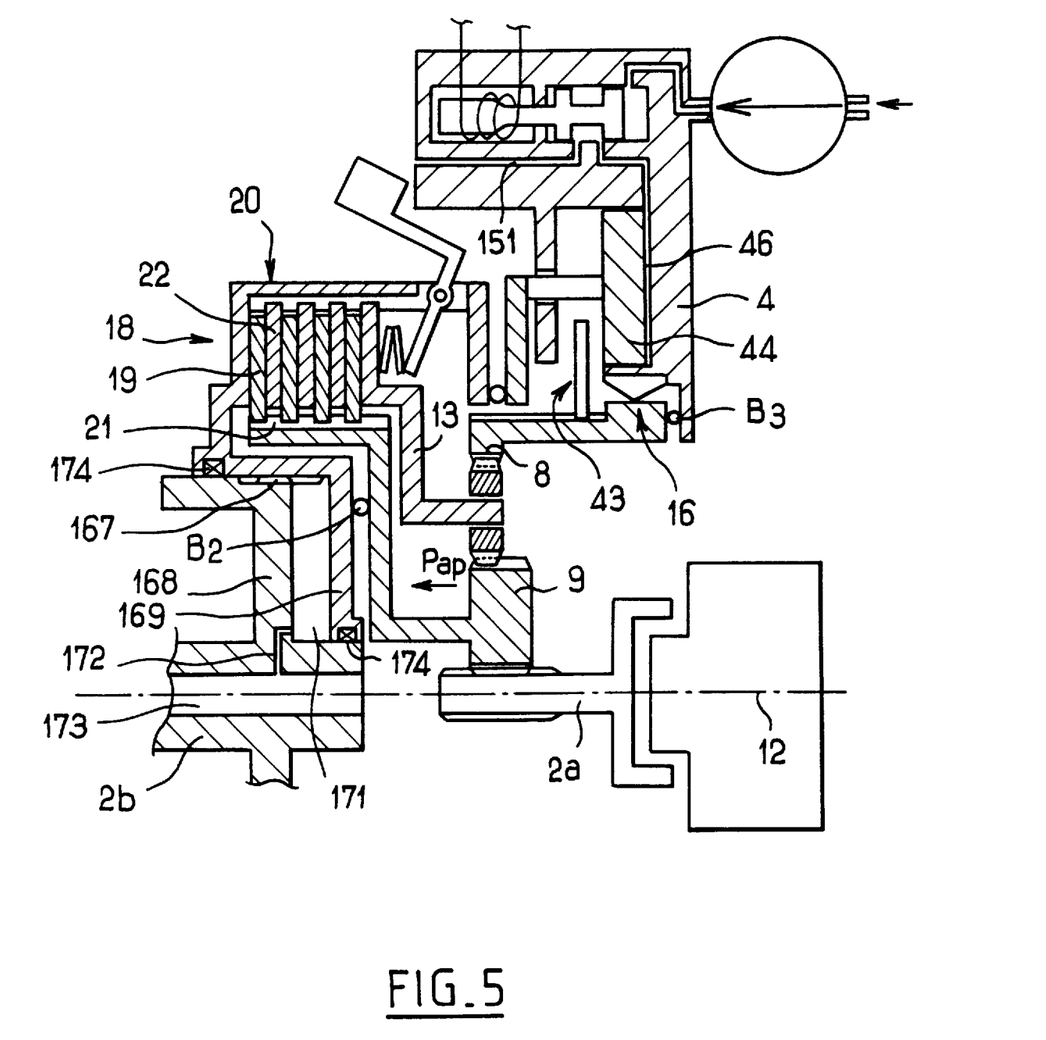
FIG. 5 is a view similar to that of FIG. 3 but relating to a second embodiment.

Thus, in the example shown in FIG. 5, not only does the necessity of draining the chamber 46 prevent the clutch 18 from engaging suddenly, but also its sudden disengagement, which would result in a sudden coming into action of the free wheel 16, is prevented by the necessity of draining the chamber 171. This is particularly useful, in the example shown in FIG. 5, where the speeds of rotation vary by a factor of 3 when the clutch is engaged and disengaged. When the clutch is being engaged, the chamber 171 draws in oil again through the passage 172.

Apart from this, the functioning of the device shown in FIG. 5 is similar to that of FIGS. 1 to 4 except that, in direct drive, the clutch 18 connects the sun wheel 9, and no longer the crown 8, with the output shaft 2b, and that in speed-reducing operation, it is the crown 8 which is immobile, which gives a reduction ratio of about 3 between the sun wheel 9 and the planet carrier 13, instead of 1.5 between the crown 8 and the planet carrier 13 in the example shown in FIGS. 1 to 3.

The invention is of course not limited to the embodiments described and shown.

It would also be possible, when the driver requires sports-style driving promoting high speeds of rotation of the input shaft 2a, to apply a constant pressure in the hydraulic chamber 46 in order to produce, on the cage 20, a force substracting from the engaging force produced by the fly-weights. Thus, the transmissible torque in direct drive for a given speed of rotation of the fly-weights is lower and the speed above which the transmission returns from speed-reducing operation to direct drive for a given torque is higher.

The control could be carried out by a hydraulic control unit and not by an electronic unit.

The described transmission devices having two ratios can be combined in order to form more complex transmissions, such as for example described in WO-A-92 07 206. The invention is also applicable to transmissions having several ratios, in particular those described in WO-A-92 07 206.

In the basic structure comprising the epicyclic train 7 of FIG. 1 or of FIG. 5, capable of performing direct drive operation by means of a clutch subjected to the action of centrifugal force and speed-reducing operation under the effect of an actuator which disengages the clutch against the action of fly-weights, it is advantageous that the force of the actuator increases with the speed of rotation to which the fly-weights are subjected. When the actuator is a hydraulic actuator 44, 46, this can be achieved by using a pump such as 57 producing a pressure which increases with the speed of the shaft 2b. Thus, when the actuator comes into action in order to disengage the clutch, the clutch disengages in a satisfactorily progressive manner as the force of the actuator 44, 46 is only reasonably greater than that of the fly-weights, whatever the speed of rotation may be.

More generally, this feature of the invention ensures that the actuator, when it is actuated, produces a force which varies such that it is reasonably greater than the variable antagonistic force which it must overcome in order to change the state of the clutch.

What is claimed is:

1. An automatically ratio-changing transmission device comprising a combination of intermeshed sets of teeth and a friction coupling means in which a movable engaging member is acted upon by antagonistic force application means, at least one of the antagonistic force application means applying onto the movable engaging member an actuating force which is a measurement of an operating condition to which said transmission device is subjected in use, the combination of teeth producing two different transmission ratios according to whether the friction coupling means is in a coupled state or in an uncoupled state, characterized by shock-absorbing means, mounted for retarding some at least of the movements of the movable engaging member between the coupled and uncoupled states of the friction coupling means.

2. A transmission device according to claim 1 wherein the shock-absorbing means are of the hydraulic type.

3. A transmission device according to claim 2 wherein the shock-absorbing means comprise a hydraulic chamber with variable volume defined by two walls which are movable with respect to each other and one of which is connected to the movable engaging member.

4. A transmission device according to claim 1 wherein the antagonistic force application means comprise centrifugal fly-weights which urge the movable engaging member towards the coupled state.

5. A transmission device according to claim 1 wherein the antagonistic force application means comprise means of transmitting to the movable engaging member, in the disengaging direction, a force which depends on the transmitted torque.

6. A transmission device according to claim 1 wherein the antagonistic force application means comprise means of transmitting to the movable engaging member, in the disengaging direction, a repelling teeth force to which one of the intermeshed sets of teeth are submitted when it is under load.

7. A transmission device according to claim 6 wherein the friction coupling means is mounted for transmitting power instead of the said teeth when it is in the coupled state, whereby the said teeth are at least partially unloaded when the coupling means are in the coupled state.

8. A transmission device according claim 1 wherein the operating condition is so selected that each change of the transmission ratio from one ratio to the other causes said operating condition to vary in such a direction that the antagonistic force being a measurement of said operating condition varies in the direction stabilising said other transmission ratio.

9. A transmission device according to claim 1 wherein the combination of teeth comprises a differential gearing comprising several rotary elements carrying intermeshed teeth, and the friction coupling means is mounted operatively between two of the rotary elements in order selectively to make the differential gearing operate with the first or with the second of two transmission ratios.

10. A transmission device according to claim 9 further comprising a free wheel to prevent a reaction rotary element of the differential gearing from rotating in the reverse direction when the friction coupling means allows a relative rotation between said two rotary elements.

11. A transmission device according to claim 10 further comprising a immobilization means to lock selectively the reaction rotary element independently from the free wheel, in that the antagonistic force application means comprise controllable force application means in order to apply selectively, to the movable engaging member, a force promoting the uncoupled state of the friction coupling means, and in that means are provided to actuate the immobilization means in the locking sense when the variable force application means cause the friction coupling means to change to the uncoupled state.

12. A transmission device according to claim 11 wherein the immobilization means comprise a brake mounted operatively in parallel with the free wheel.

13. A transmission device according to claim 11 wherein the controllable force application means comprise an actuator device which actuates the immobilization means directly and applies force to the movable engaging member in the direction of disengagement by means of an axial thrust bearing.

14. A transmission device according to claim 1 wherein the antagonistic force application means comprise controllable force application means to apply selectively to the movable engaging member a force promoting one of the coupled or uncoupled states of the friction coupling device.

15. A transmission device according to claim 11 wherein the controllable force application means, when they are activated, promote operation of the transmission Crevice with its lowest transmission ratio.

16. A transmission device according to claim 11 further comprising means of controlling the activation of the controllable force application means when a speed of rotation becomes lower than a predetermined threshold, and means of selectively controlling the said activation independently from the predetermined threshold.

17. A transmission device according claim 11 wherein the shockabsorbing means comprise means of retarding an actuator member which is part of the controllable force application means.

18. A transmission device according to claim 17 wherein the controllable force application means are capable of applying the controllable force in a first direction of movement of the actuator member, and the means of retarding the actuator member retard movements of the actuator member in a direction opposite to the first direction.

19. A transmission device according to claim 18 wherein the controllable force application means comprise an hydraulic actuator and the means of retarding the actuator member comprise a hydraulically resistant drain path for a hydraulic chamber of the actuator, whereby the actuator member is retarded by a loss of hydraulic pressure upon movement thereof in a direction corresponding to the draining of the hydraulic chamber.

20. A transmission device according to claim 11 wherein the shock-absorbing means comprise means for retarding the movements ot the movable engaging member carried out in the direction of the controllable force application.

21. A transmission device according to claim 11 wherein the controllable force application means, when they are activated, produce a force whose magnitude varies, as a function of a predetermined operating parameter, in a same direction as an antagonistic force produced by at least one other means of antagonistic force application and which the controllable force application means must overcome in order to change the coupling state of the friction coupling means.

22. A transmission device according to claim 1 wherein the shock-absorbing means comprise a hydraulic chamber having a variable volume defined by two walls which are movable with respect to each other and one of which is connected to the movable engaging member in such a way that one of the directions of movement of the movable engaging member causes the hydraulic chamber to be drained through a hydraulically resistant path.

23. A method of controlling a transmission device comprising a combination of intermeshed teeth and a friction coupling means which causes the combination of teeth to operate according to one or the other of two transmission ratios depending on whether the friction coupling means is in the coupled state or in the uncoupled state, a method in which a movable engaging member of the friction coupling means is subjected to two basic antagonistic forces, one of which, at each change of state of the friction coupling device, varies in the sense of stabilizing the new state, at least one of the antagonistic force application means applying onto the movable engaging member an actuating force which is a measurement of an operating condition to which said transmission device is subjected, said method comprising steps of:

furthermore subjecting the movable engaging member to a controllable force, thereby to selectively promote appearance of one of the two states; and retarding at least one direction of movement of the engaging member.

24. A method according to claim 23 wherein the movable engaging member is retarded in opposition to its movements in the direction opposite to the controllable force application.

25. A method according to claim 23 wherein the controllable force is applied for a predetermined range of variation of an operating condition to which the transmission device is subjected.

26. A method according to claim 24 wherein the controllable force is applied for a predetermined range of speed.

27. A method according to claim 25 wherein at least one of the limits of the predetermined range is adjusted.

28. A method according to claim 23 wherein the controllable force is applied in a direction opposite to one of the antagonistic forces, produced by a tachometric means and tending to cause the combination of teeth to operate with the highest of the two transmission ratios.

29. A method according to claim 28 wherein the tachometric means is of the centrifugal type and produces a force substantially proportional to the square of the speed of rotation to which it is subjected.

30. A method according to claim 23 wherein the controllable force is applied in the same direction as one of the antagonistic forces produced by a dynamometric means and tending to cause the combination of teeth to operate with the lowest of the two transmission ratios.

31. A method according to claim 28 wherein the controllable force is applied for a range of low speeds such that the transmission device operates with its lowest transmission ratio for that range.

32. A method according to claim 28 applied to a transmission device in which:

the combination of teeth is a differential gearing which operates in direct drive when the friction coupling means is in the coupled state;

a free wheel prevents a reaction member from rotating in a reverse direction when the friction coupling means is in the uncoupled state;

the antagonistic force application means comprise a spring tending to put the friction coupling means in the coupled state, characterized in that the controllable force is applied in the direction tending to put the friction coupling means in the uncoupled state when the speed of an output shaft of the transmission device is lower than a certain threshold while a power source installed upstream of the transmission device is active.

33. A method according to claim 23 wherein the controllable force is varied in the direction promoting operation of the combination of teeth with its lowest ratio upon detection of a heavy demand for power to be transmitted by the transmission device.

34. A method according to claim 23 wherein the magnitude of the controllable force is caused to vary, as a function of a predetermined operating parameter, in the same direction as at least one basic antagonistic force that the controllable force application must overcome in order to change the coupling state of the friction coupling means.

* * * * *